(12) United States Patent
Winkle et al.

(10) Patent No.: US 10,546,505 B2
(45) Date of Patent: *Jan. 28, 2020

(54) SYSTEMS AND METHODS FOR PROVIDING EMERGENCY ALERTS AT EMERGENCY LANDING AREAS OF UNMANNED AERIAL VEHICLES

(71) Applicant: Walmart Apollo, LLC, Bentonville, AR (US)

(72) Inventors: David C. Winkle, Bella Vista, AR (US); John J. O'Brien, Farmington, AR (US); Donald R. High, Noel, MO (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,104

(22) Filed: Jan. 25, 2019

(65) Prior Publication Data

US 2019/0156685 A1 May 23, 2019

Related U.S. Application Data

(63) Continuation of application No. 16/011,932, filed on Jun. 19, 2018, now Pat. No. 10,332,407.

(Continued)

(51) Int. Cl.
G08G 5/00 (2006.01)
(52) U.S. Cl.
CPC ......... *G08G 5/0069* (2013.01); *G08G 5/0056* (2013.01); *B64C 2201/14* (2013.01); *B64C 2201/146* (2013.01)

(58) Field of Classification Search
CPC ............ B64C 2201/00; B64C 2201/14; B64C 2201/141; B64C 2201/143;
(Continued)

(56) References Cited

U.S. PATENT DOCUMENTS

| 1,001,746 A | 8/1911 | English |
| 7,167,782 B2 | 1/2007 | Humbard |

(Continued)

FOREIGN PATENT DOCUMENTS

WO 2016026023 2/2016

OTHER PUBLICATIONS

"Drones for Emergency Alerts?", http://www.hyperreach.com/dronesforemergencyalerts/, 2016, pp. 1-3.
(Continued)

*Primary Examiner* — Van T Trieu
(74) *Attorney, Agent, or Firm* — Fitch, Even, Tabin and Flannery, LLP

(57) ABSTRACT

In some embodiments, methods and systems are provided that provide for controlling unmanned aerial vehicles (UAVs) experiencing emergency landings and providing emergency alerts to the predicted emergency landing locations of the UAV. Each UAV includes sensors configured to detect at least one status input associated with the UAV during flight along its flight route. Each UAV analyzes the status inputs while in flight in order to predict an emergency landing location where the UAV would land if unable to fly due to an emergency condition. The UAV is configured to transmit an alert signal to electronic devices proximate the predicted emergency landing location to notify users of the electronic devices that the unmanned aerial vehicle is going to experience an emergency landing at the predicted emergency landing location.

20 Claims, 4 Drawing Sheets

Related U.S. Application Data

(60) Provisional application No. 62/529,653, filed on Jul. 7, 2017.

(58) Field of Classification Search
CPC ........ B64C 2201/145; B64C 2201/146; B64C 2201/148; B64C 2201/182; B64C 2201/185; B64C 39/02; B64C 39/024; B60D 45/00; B60D 45/0005; B60D 45/0045; G08B 5/0069; G08G 5/00; G08G 5/0056; G08G 5/0069
See application file for complete search history.

(56) References Cited

U.S. PATENT DOCUMENTS

| | | | |
|---|---|---|---|
| 8,032,267 | B1 | 10/2011 | Simon |
| 9,274,529 | B2 | 3/2016 | Ben-Shachar |
| 9,466,218 | B2 | 10/2016 | Jarrell |
| 9,483,950 | B2 | 11/2016 | Wang |
| 9,524,648 | B1 | 12/2016 | Gopalakrishnan |
| 9,550,577 | B1 | 1/2017 | Beckman |
| 9,573,684 | B2 | 2/2017 | Kimchi |
| 10,061,746 | B2 | 8/2018 | Yount |
| 2003/0060940 | A1 | 3/2003 | Humbard |
| 2015/0120094 | A1 | 4/2015 | Kimchi |
| 2015/0277440 | A1 | 10/2015 | Kimchi |
| 2016/0196755 | A1 | 7/2016 | Navot |
| 2016/0257401 | A1 | 9/2016 | Buchmueller |
| 2017/0004714 | A1 | 1/2017 | Rhee |
| 2017/0110017 | A1 | 4/2017 | Kimchi |
| 2017/0369183 | A1 | 12/2017 | Tarimala |
| 2018/0237148 | A1* | 8/2018 | Hehn ............... B64C 39/024 |
| 2019/0014461 | A1 | 1/2019 | Winkle |

OTHER PUBLICATIONS

Faheem, Rao Muhammad, et al.; "UAV Emergency Landing Site Selection System using Machine Vision", Journal of Machine Intelligence, vol. 1, No. 1, 2016, pp. 13-20.

Fikri, Rafid, et al.; "SmartDrone for Emergency Alert, Guide & Searching", http://unicefchallenge.com/smartdroneforemergencyalarmguidingsearching/, Nov. 24, 2014, pp. 1-12.

Levy, Nat; "Amazon drones could hitch rides on trucks or buses en route to delivery location, patent filing shows", http://www.geekwire.com/2016/amazondronescouldhitchridesontrucksorbusesenroutetodeliverylocationpatentshows/, Sep. 8, 2016, pp. 1-7.

Limer, Eric; "A 1000W DIY Flashlight Turns a Drone Into a UFO", http://www.popularmechanics.com/flight/drones/a23401/dronediy1000wflashlight/, Oct. 17, 2016, pp. 1-6.

PCT; App. No. PCT/US2018/040852; International Search Report and Written Opinion dated Sep. 28, 2018.

USPTO; U.S. Appl. No. 16/011,932; Notice of Allowance dated Nov. 27, 2018.

* cited by examiner

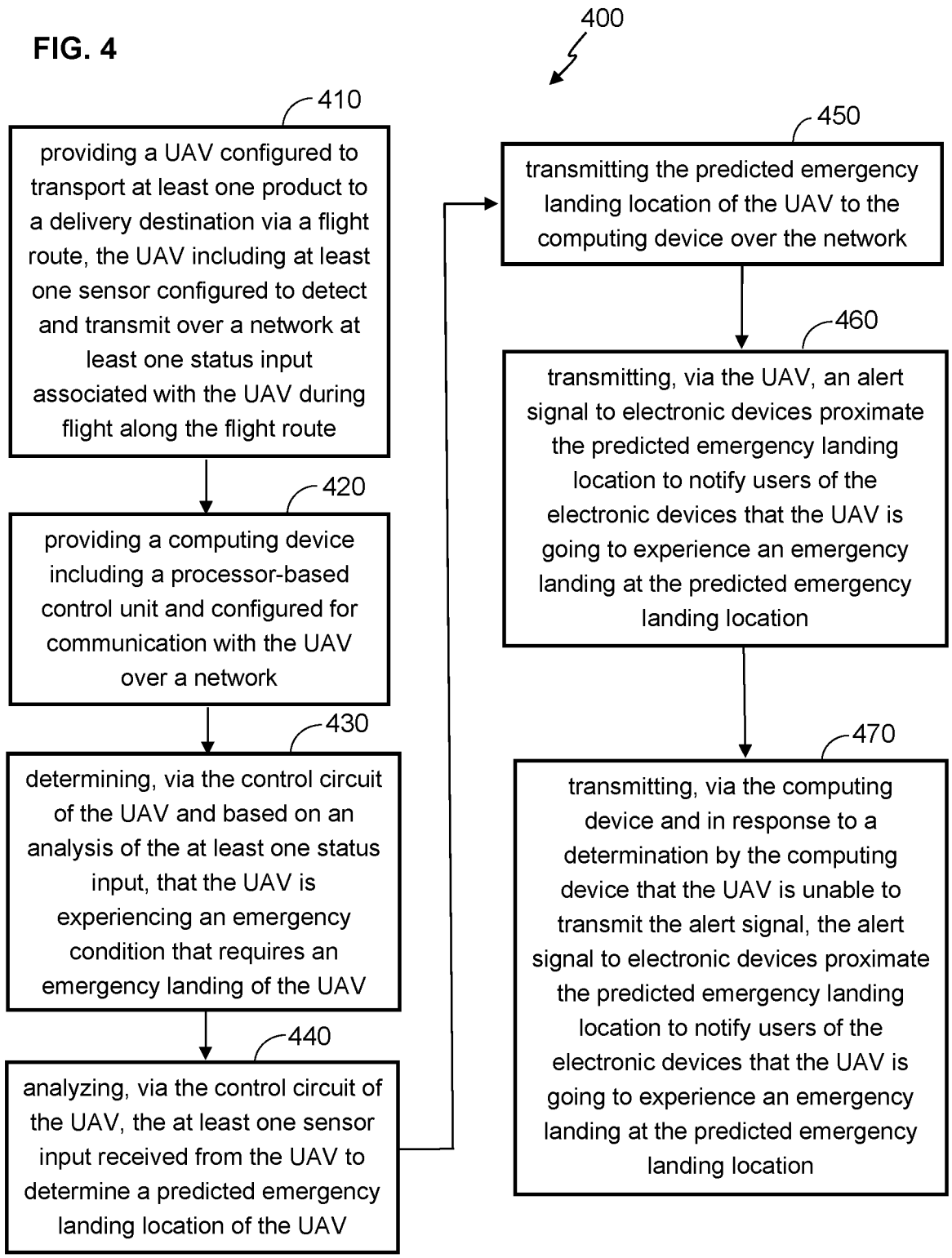

SYSTEMS AND METHODS FOR PROVIDING EMERGENCY ALERTS AT EMERGENCY LANDING AREAS OF UNMANNED AERIAL VEHICLES

RELATED APPLICATIONS

This application is a continuation of U.S. application Ser. No. 16/011,932, filed on Jun. 19, 2018, now U.S. Pat. No. 10,332,407, issued on Jun. 25, 2019, which claims the benefit of U.S. Provisional Application No. 62/529,653, filed Jul. 7, 2017, each of which is incorporated herein by reference in its entirety.

TECHNICAL FIELD

This disclosure relates generally to facilitating the landings of unmanned aerial vehicles and, in particular, to providing emergency alerts to computing devices and/or people proximate predicted emergency landing locations of unmanned aerial vehicles.

BACKGROUND

Transporting products via unmanned aerial vehicles (UAVs) over populated areas such as towns and cities requires UAV operators to consider the risks associated with unexpected malfunctions, in-air collisions, and/or other emergency events that may lead to emergency crash landings of the UAVs. Given that the UAVs, both when empty and when carrying cargo, can present a significant injury risk to people and animals on the ground as well as a personal property risk to buildings and cars on the ground in the event that the UAVs crash land, especially in a densely populated area such as a city, early warnings of such potential crash landings is desirable.

BRIEF DESCRIPTION OF THE DRAWINGS

Disclosed herein are embodiments of systems, apparatuses, and methods pertaining to controlling an unmanned aerial vehicle experiencing an emergency landing and providing an emergency alert to an area proximate a predicted emergency landing location of the unmanned aerial vehicle. This description includes drawings, wherein:

FIG. 4 is a flow chart diagram of a process of controlling an unmanned aerial vehicle experiencing an emergency landing and providing an emergency alert to an area proximate a predicted emergency landing location of the UAV in accordance with some embodiments.

Figure 1:
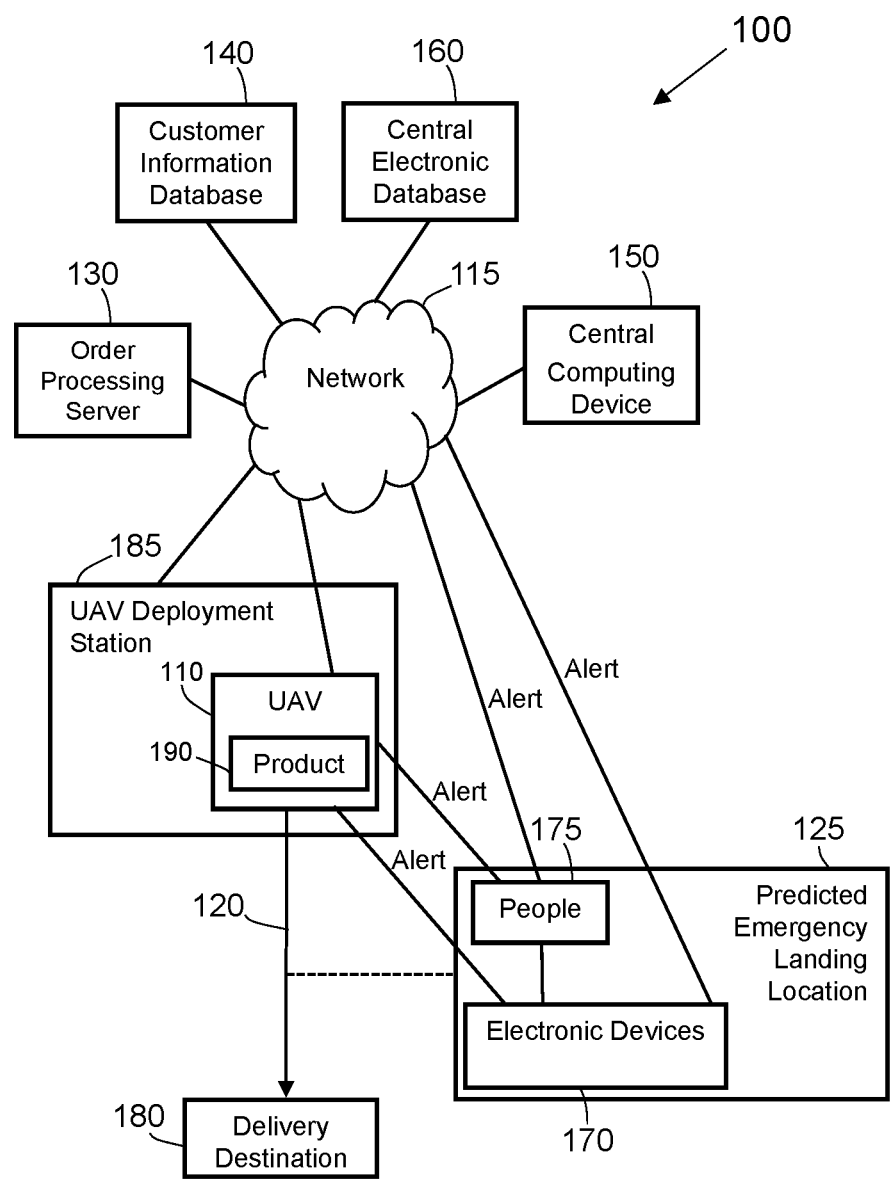
FIG. 1 is a diagram of a system for controlling an unmanned aerial vehicle experiencing an emergency landing and providing an emergency alert to an area proximate a predicted emergency landing location of the UAV in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, apparatuses, and methods are provided for providing emergency warnings to computing devices and/or people located proximate a predicted emergency landing location of a UAV. In some embodiments, the UAVs are configured to send out an emergency signal to electronic devices in the area after the UAV determines that an emergency landing becomes inevitable. In some embodiments, if the UAV is unable to transmit such an emergency signal, a central computing device is configured to transmit such an emergency signal. The emergency signal may be in the form of an electronic message (e.g., text message), an audible alert (e.g., a siren), and/or a visual alert (e.g., a flare, a light-generating device, smoke-generating device, or the like).

In some embodiments, a system for controlling an unmanned aerial vehicle experiencing an emergency landing and providing an emergency alert to an area proximate a predicted emergency landing location of the unmanned aerial vehicle is provided. The system includes an unmanned aerial vehicle configured to transport at least one product to a delivery destination via a flight route. The unmanned aerial vehicle includes at least one sensor configured to detect and transmit over a network at least one status input associated with the unmanned aerial vehicle during flight along the flight route. The system also includes a computing device including a processor-based control unit and configured for communication with the unmanned aerial vehicle over a network. The unmanned aerial vehicle includes a processor-based control circuit configured to: determine, based on an analysis of the at least one status input, that the unmanned aerial vehicle is experiencing an emergency condition that requires an emergency landing of the unmanned aerial vehicle; analyze the at least one sensor input in order to determine a predicted emergency landing location of the unmanned aerial vehicle; and transmit the predicted emergency landing location of the unmanned aerial vehicle to the computing device over the network. The unmanned aerial vehicle is configured to transmit an alert signal to electronic devices proximate the predicted emergency landing location to notify users of the electronic devices that the unmanned aerial vehicle is going to experience an emergency landing at the predicted emergency landing location. In response to a determination by the computing device that the unmanned aerial vehicle is unable to transmit the alert signal, the computing device is configured to transmit the alert signal to electronic devices proximate the predicted emergency landing location to notify users of the electronic devices that the unmanned aerial vehicle is going to experience an emergency landing at the predicted emergency landing location.

In another embodiment, a method for controlling an unmanned aerial vehicle experiencing an emergency landing and providing an emergency alert to an area proximate a predicted emergency landing location of the unmanned aerial vehicle includes: providing an unmanned aerial vehicle configured to transport at least one product to a delivery destination via a flight route, the unmanned aerial vehicle including at least one sensor configured to detect and transmit over a network at least one status input associated with the unmanned aerial vehicle during flight along the flight route; providing a computing device including a processor-based control unit and configured for communication with the unmanned aerial vehicle over a network; determining, via the control circuit of the unmanned aerial vehicle and based on an analysis of the at least one status input, that the unmanned aerial vehicle is experiencing an emergency condition that requires an emergency landing of the unmanned aerial vehicle; analyzing, via the control circuit of the unmanned aerial vehicle, the at least one sensor input received from the unmanned aerial vehicle in order to determine a predicted emergency landing location of the unmanned aerial vehicle; transmitting the predicted emergency landing location of the unmanned aerial vehicle to the computing device over the network; transmitting, via the unmanned aerial vehicle, an alert signal to electronic devices proximate the predicted emergency landing location to notify users of the electronic devices that the unmanned aerial vehicle is going to experience an emergency landing at the predicted emergency landing location; and transmitting, via the computing device and in response to a determination by the computing device that the unmanned aerial vehicle is unable to transmit the alert signal, the alert signal to electronic devices proximate the predicted emergency landing location to notify users of the electronic devices that the unmanned aerial vehicle is going to experience an emergency landing at the predicted emergency landing location.

FIG. 1 shows an embodiment of a system 100 for controlling an unmanned aerial vehicle 110 experiencing an emergency landing and providing an emergency alert to an area proximate a predicted emergency landing location 125 of the UAV 110, such that electronic devices and/or people in the predicted emergency landing location 125 are warned that a UAV 110 is going to experience an emergency landing in the predicted emergency landing location 125. It will be understood that the details of this example are intended to serve in an illustrative capacity and are not necessarily intended to suggest any limitations in regards to the present teachings. In some aspects, the exemplary UAV 110 of FIG. 1 is configured to transport one or more products 190 from one or more UAV deployment stations 185 to one or more delivery destinations 180 via the flight route 120. In other aspects, the UAV 110 is configured to fly along the flight route 120 from a UAV deployment station 185 to a product pick up location. In yet other aspects, the UAV 110 is configured to fly along the flight route 120 from a delivery destination 180 or a product pick up location back to the UAV deployment station 185.

A customer may be an individual or business entity. A delivery destination 180 may be a home, work place, or another location designated by the customer when placing the order. Exemplary products 190 that may be ordered by the customer via the system 100 may include, but are not limited to, general-purpose consumer goods (retail products and goods not for sale) and consumable products (e.g., food items, medications, or the like). A UAV deployment station 185 can be mobile (e.g., vehicle-mounted) or stationary (e.g., installed at a facility of a retailer). A retailer may be any entity operating as a brick-and-mortar physical location and/or a website accessible, for example, via an intranet, internet, or another network, by way of which products 190 may be ordered by a consumer for delivery via a UAV 110.

The exemplary system 100 depicted in FIG. 1 includes an order processing server 130 configured to process a purchase order by a customer for one or more products 190. It will be appreciated that the order processing server 130 is an optional component of the system 100, and that some embodiments of the system 100 are implemented without incorporating the order processing server 130. The order processing server 130 may be implemented as one server at one location, or as multiple interconnected servers stored at multiple locations operated by the retailer, or for the retailer. As described in more detail below, the order processing server 130 may communicate with one or more electronic devices of system 100 via a network 115. The network 115 may be a wide-area network (WAN), a local area network (LAN), a personal area network (PAN), a wireless local area network (WLAN), Wi-Fi, Zigbee, Bluetooth, or any other internet or intranet network, or combinations of such networks. Generally, communication between various electronic devices of system 100 may take place over hard-wired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 communicates with a customer information database 140. In some embodiments, the customer information database 140 may be configured to store information associated with customers of the retailer who order products 190 from the retailer. In some embodiments, the customer information database 140 may store electronic information including but not limited to: personal information of the customers, including payment method information, billing address, previous delivery addresses, phone number, product order history, pending order status, product order options, as well as product delivery options (e.g., delivery by UAV) of the customer. The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may likewise be cloud-based.

In the embodiment of FIG. 1, the order processing server 130 is in communication with a central electronic database 160 configured to store information associated with the inventory of products 190 made available by the retailer to the customer, as well as information associated with the UAVs 110 being deployed to deliver products 190 to the delivery destinations 180 specified by the customers. In some aspects, the central electronic database 160 stores information including but not limited to: information associated with the products 190 being transported by the UAV 110; inventory (e.g., on-hand, sold, replenishment, etc.) information associated with the products 190; flight status information associated with the UAV 110; information associated with predetermined flight routes 120 of the UAV 110; status input information detected by one or more sensors of the UAV 110 during flight along the flight routes 120; information indicating the coordinates of the predicted emergency landing location 125; information indicating one or more electronic devices 170 and people 175 present at the predicted emergency landing location 125, and information indicating collateral damage associated with the predicted emergency landing location 125.

The central electronic database 160 may be stored, for example, on non-volatile storage media (e.g., a hard drive, flash drive, or removable optical disk) internal or external to the order processing server 130, or internal or external to computing devices separate and distinct from the order processing server 130. The central electronic database 160 may likewise be cloud-based. While the customer information database 140 and the central electronic database 160 are shown in FIG. 1 as two separate databases, it will be appreciated that the customer information database 140 and the central electronic database 160 can be incorporated into one database.

With reference to FIG. 1, the central computing device 150 may be a stationary or portable electronic device, for example, a desktop computer, a laptop computer, a tablet, a mobile phone, or any other electronic device including a processor-based control circuit (i.e., control unit). For purposes of this specification, the term "central computing device" will be understood to refer to a computing device owned by the retailer or any computing device owned and/or operated by an entity (e.g., delivery service) having an obligation to deliver products 190 for the retailer. In the embodiment of FIG. 1, the central computing device 150 is configured for data entry and processing as well as for communication with other devices of system 100 via the network 115 which, as described above. In some embodiments, as will be described below, the central computing device 150 is configured to access the central electronic database 160 and/or customer information database 140 via the network 115 to facilitate delivery of products 190 via UAVs 110 along flight routes 120 to delivery destinations 180, and to facilitate safe emergency landings of UAVs 110 in the event that the UAVs 110 are unable to continue flight along the flight routes 120.

In the system 100 of FIG. 1, the central computing device 150 is in two-way communication with the UAV 110 via the network 115. In some aspects, the central computing device 150 is configured to transmit at least one signal to the UAV 110 to cause the UAV 110 to fly along a flight route 120 determined by the central computing device 150 while transporting products 190 from the UAV deployment station 185 to the intended delivery destination 180 (e.g., to drop off a product 190 or to pick up a product 190), or while returning from the delivery destination 180 to the UAV deployment station 185 (e.g., after dropping off a product 190 or after picking up a product 190). In other aspects, after a customer places an on order for one or more products 190 and specifies a delivery destination 180 for the products 190 via the order processing server 130, prior to and/or after the commencement of a delivery attempt of the products 190 ordered by the customer via a UAV 110 to the delivery destination 180, the central computing device 150 is configured to obtain GPS coordinates associated with the delivery destination 180 selected by the customer and GPS coordinates associated with the UAV deployment station 185 of the retailer (which houses the UAV 110 that will deliver the products 190), and to determine a flight route 120 for the UAV 110 in order to deliver the customer-ordered products 190 from the UAV deployment station 185 to the delivery destination 180.

In yet other aspects, if the computing device 150 determines that a UAV 110 is experiencing an inevitable emergency landing and that the UAV 110 is unable to transmit an alert signal to electronic devices 170 and/or people 175 at the predicted emergency landing location 125, the computing device 150 is configured to transmit (directly or via another computing device, sound-generating device, display device, or the like) an alert signal to electronic devices and/or people proximate the predicted emergency landing location 125, thereby notifying users of the electronic devices 170 and/or people 175 at the predicted emergency landing location 125 that the UAV 110 is going to emergency land at the predicted emergency landing location 125. In one approach, the computing device 150 may determine that UAV 110 is experiencing an emergency condition that will inevitably cause the UAV 110 to crash land after the computing device 150 receives an emergency (e.g., SOS) signal from the UAV 110. In one approach, the computing device 150 may determine that UAV 110 is experiencing an emergency condition that will inevitably cause the UAV 110 to crash land after the computing device 150 queries the UAV 110 as to flight status and receives no response from the UAV 110.

Figure 3:
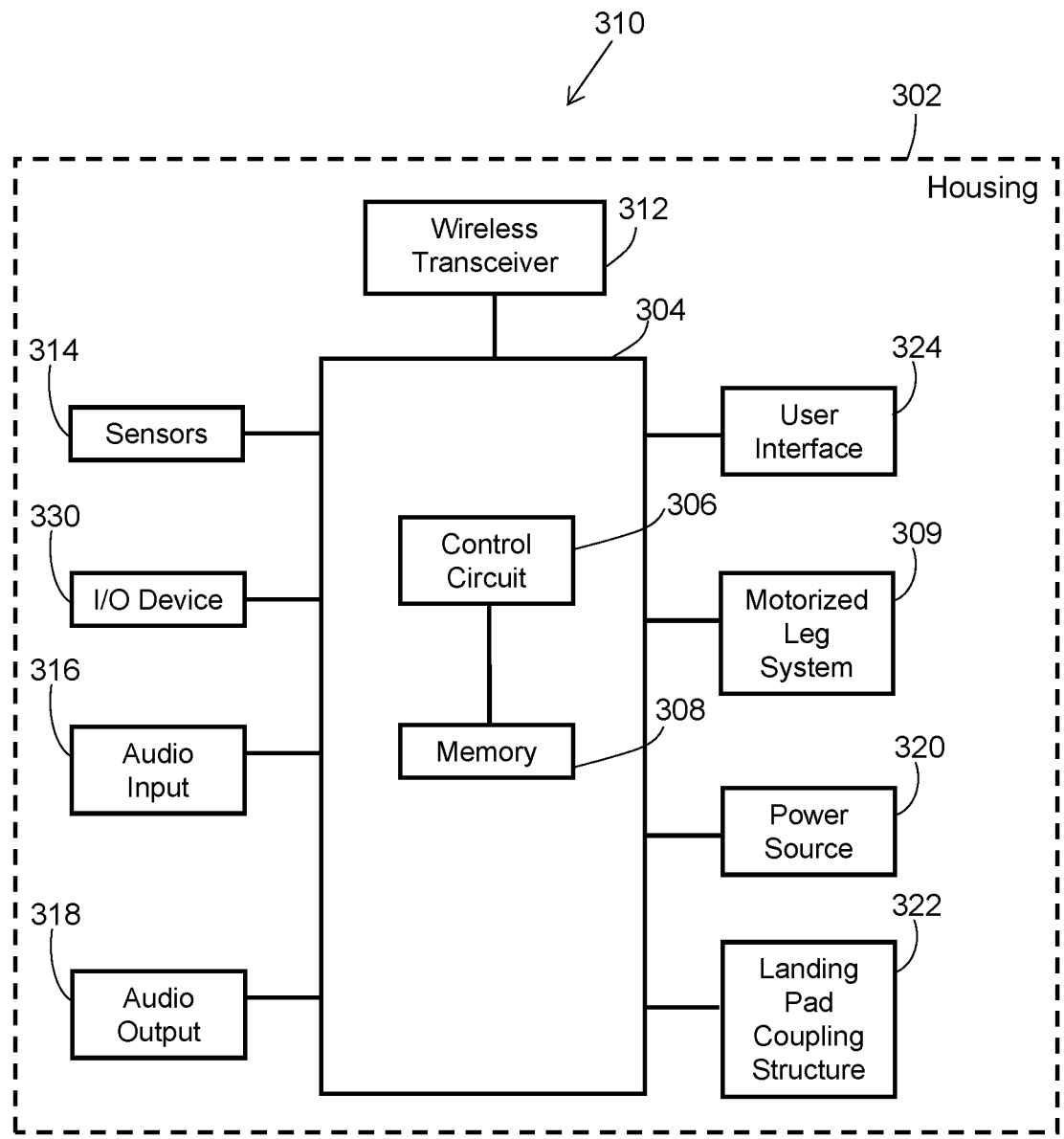
FIG. 3 comprises a block diagram of an unmanned aerial vehicle as configured in accordance with some embodiments.

The UAV 110, which will be discussed in more detail below with reference to FIG. 3, is generally an unmanned aerial vehicle configured to autonomously traverse one or more intended environments in accordance with one or more flight routes 120 determined by the central computing device 150, and typically without the intervention of a human or a remote computing device, while retaining the products 190 therein and delivering the products 190 to the delivery destination 180. In some instances, however, a remote operator or a remote computer (e.g., central computing device 150) may temporarily or permanently take over operation of the UAV 110 using feedback information (e.g., audio and/or video content, sensor information, etc.) communicated from the UAV 110 to the remote operator or computer via the network 115, or another similar distributed network. While only one UAV 110 is shown in FIG. 1 for ease of illustration, it will be appreciated that in some embodiments, the central computing device 150 may communicate with, and/or provide flight route instructions to more than one (e.g., 5, 10, 20, 50, 100, 1000, or more) UAVs 110 simultaneously to guide the UAVs 110 to transport products 190 to their respective delivery destinations 180 and/or to facilitate safe emergency landings of the UAVs 110.

In some embodiments, as will be discussed in more detail below, the UAV 110 is equipped with one or more sensors configured to detect and transmit (e.g., internally to the UAV 110 and/or over the network 115) at least one status input associated with the UAV 110 during flight along the flight route 120. In addition, in some configurations, the UAV 110 includes a processor-based control circuit configured to determine, based on an analysis of the status input, that the UAV 110 is experiencing an emergency condition that requires an emergency landing of the UAV 110 and a predicted emergency landing location 125 of the UAV 110, as well as to transmit the predicted emergency landing location 125 of the UAV 110 over the network 115, for example, to the central computing device 150. In some aspects, the UAV 110 is configured to transmit an alert signal to electronic devices 170 (and/or people 175) proximate the predicted emergency landing location 125 to notify users of the electronic devices 170 (and/or people not having electronic devices 170) that the UAV 110 is going to crash land at the predicted emergency landing location 125.

Figure 2:
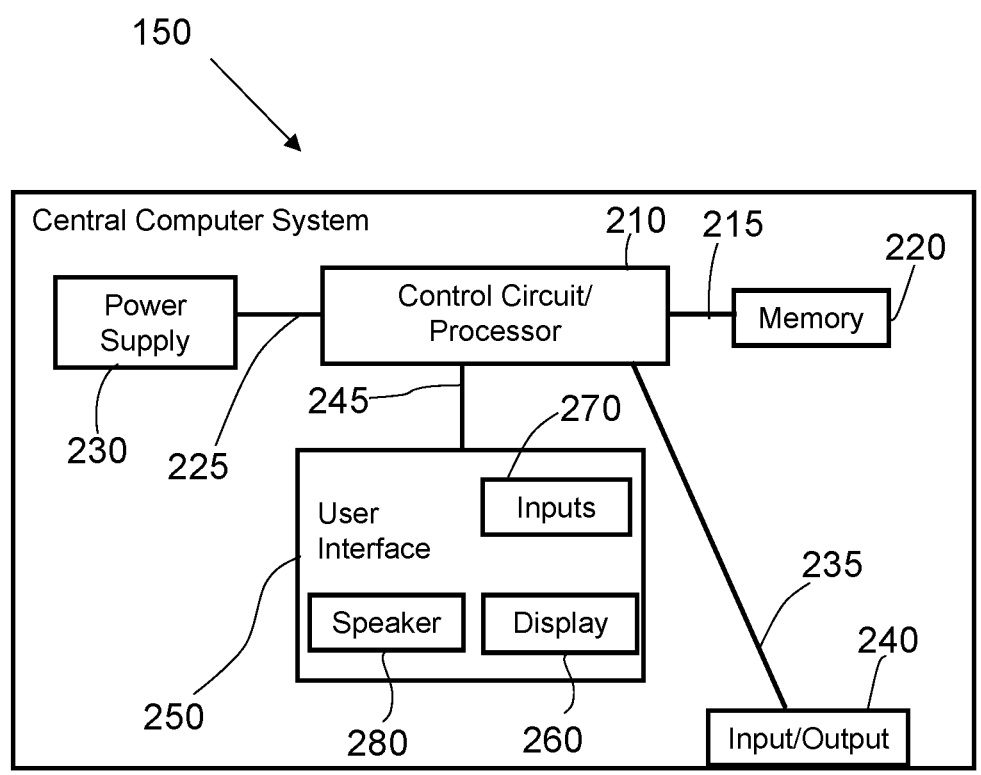
FIG. 2 is a functional diagram of an exemplary computing device usable with the system of FIG. 1 in accordance with some embodiments.

With reference to FIG. 2, an exemplary central computing device 150 configured for use with the systems and methods described herein may include a control unit or control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 210 of the central computing device 150 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Thus, the memory and/or the control circuit may be referred to as a non-transitory medium or non-transitory computer readable medium.

The control circuit 210 of the central computing device 150 is also electrically coupled via a connection 235 to an input/output 240 that can receive signals from the UAV 110 and/or order processing server 130 and/or customer information database 140 and/or central electronic database 160. For example, in some approaches, the computing device 150 receives sensor data representing at least one status input associated with the UAV 110 during flight of the UAV 110 along the flight route 120, electronic emergency (e.g., SOS) signals from the UAV 110 indicating that the UAV 110 is experiencing an emergency condition (including an identification of the emergency condition) that requires an emergency landing of the UAV 110, and data relating to an order for a product 190 placed by the customer, location data (e.g., GPS coordinates) associated with the delivery destination 180 selected by the customer, or from any other source that can communicate with the central computing device 150 via a wired or wireless connection.

The input/output 240 of the computing device 150 can also send signals to the UAV 110 (e.g., a control signal indicating a flight route 120 determined by the computing device 150 for the UAV 110 in order to deliver the product 190 from the UAV deployment station 185 to the delivery destination 180). The input/output 240 of the central computing device 150 can also send signals to the order processing server 130 (e.g., notification indicating that the UAV 110 was unable to successfully deliver the product 190 to the delivery destination 180 due to an emergency landing). In some aspects, the computing device 150 is configured to transmit, via the input/output 240 and over the network 115, an alert signal to electronic devices 170 and/or people 175 at the predicted emergency landing location 125 to notify users of electronic devices 170 and/or people 175 that the UAV 110 is going to crash land at the predicted emergency landing location 125.

In the embodiment of FIG. 2, the processor-based control circuit 210 of the central computing device 150 is electrically coupled via a connection 245 to a user interface 250, which may include a visual display or display screen 260 (e.g., LED screen) and/or button input 270 that provide the user interface 250 with the ability to permit an operator of the central computing device 150 to manually control the central computing device 150 by inputting commands via touch-screen and/or button operation and/or voice commands to, for example, to transmit a control signal to the UAV 110 in order to provide the UAV 110 with the flight route 120 from the UAV deployment station 185 to the delivery destination 180, or to transmit an alert signal to electronic devices 170 and/or people 175 proximate the predicted emergency landing location 125 to provide a warning to the users of the electronic devices 170 and/or people 175 at the emergency landing location 125 that the UAV 110 is going to emergency land at the predicted emergency landing location 125. It will be appreciated that the performance of such functions by the processor-based control circuit 210 of the central computing device 150 is not dependent on a human operator, and that the control circuit 210 may be programmed to perform such functions without a human operator.

In some aspects, the display screen 260 of the central computing device 150 is configured to display various graphical interface-based menus, options, and/or alerts that may be transmitted to the central computing device 150 and displayed on the display screen 260 in connection with various aspects of the delivery of the products 190 ordered by the customers by the UAVs 110, as well as various aspects of predicted and actual emergency landings of the UAV 110. The inputs 270 of the central computing device 150 may be configured to permit an operator to navigate through the on-screen menus on the central computing device 150 and change and/or update the flight route 120 of the UAV 110 toward or away from the delivery destination 180 and/or to guide a UAV 110 experiencing an emergency landing toward a predicted emergency landing location 125, and/or to cause the UAV 110 and/or computing device 150 to generate an alert signal to electronic devices 170 and/or people 175 at the predicted emergency landing location 125 to notify users of the electronic devices 170 and/or people 175 at the predicted emergency landing location 125 that the UAV 110 is going to emergency land at the predicted emergency landing location 125. It will be appreciated that the display screen 260 may be configured as both a display screen and an input 270 (e.g., a touch-screen that permits an operator to press on the display screen 260 to enter text and/or execute commands.)

In some embodiments, after an order for one or more products 190 is placed by a customer via the order processing server 130, and prior to commencement of the delivery attempt of one or more products 190 via the UAV 110 to the delivery destination 180 designated by the customer, the control circuit 210 of the central computing device 150 is programmed to obtain the GPS coordinates of the delivery destination 180 where the product 190 is to be delivered by the UAV 110. For example, in embodiments, where the customer requested delivery of a product 190 or products 190 to a delivery destination 180 associated with a specific geographic location (e.g., home address, work address, etc.), the control circuit 210 of the central computing device 150 obtains the GPS coordinates associated with the delivery destination 180, for example, from the customer information database 140, or from another source configured to provide GPS coordinates associated with a given physical address.

In some embodiments, the control circuit 210 of the central computing device 150 is configured to analyze the GPS coordinates of both the UAV deployment station 185 and the delivery destination 180, and to determine and generate a flight route 120 for the UAV 110. In one aspect, the flight route 120 determined by the central computing device 150 is based on a starting location of the UAV 110 (e.g., a UAV deployment station 185) and the intended destination of the UAV 110 (e.g., delivery destination 180 and/or product pick up destination). In some aspects, the central computing device 150 is configured to calculate multiple possible flight routes 120 for the UAV 110, and then select a flight route 120 determined by the central computing device 150 to provide an optimal flight time and/or optimal predicted emergency landing locations 125 for the UAV 110 while flying along the original flight route 120. In some embodiments, after the control circuit 210 of the central computing device 150 determines and generates a flight route 120 for the UAV 110, the central computing device 150 transmits, via the output 240 and over the network 115, a signal including the flight route 120 to the UAV 110 assigned to deliver one or more products 190 from the UAV deployment station 185 to the delivery destination 180.

In some aspects, prior to the UAV 110 being deployed from the UAV deployment station 185, the control circuit 210 of the central computing device 150 and/or the control circuit 306 of the UAV 310 (which will be discussed in more detail below) is programmed to analyze the determined flight route 120 of the UAV 110 and to predict an emergency landing location 125 where the UAV 110 would land if the UAV 110 is unable to fly due to one or more emergency conditions (that force the UAV 110 to crash land) at any given point along the flight route 120. In some embodiments, after the UAV 110 has been deployed and while the UAV 110 is in flight along a flight route 120 predetermined by the central computing device 150, the control circuit 210 of the central computing device 150 is programmed predict, in real time, emergency landing locations 125 where the UAV 110 would land if the UAV 110 is unable to fly due to one or more emergency conditions at any point along the flight route 120.

In some embodiments, the central computing device 150 is capable of integrating 2D and 3D maps of the navigable space of the UAV 110 along the flight route 120 determined by the central computing device 150, complete with topography data comprising: no fly zones along the flight route 120 and on-ground buildings, hills, bodies of water, power lines, roads, vehicles, people, and/or known safe landing points for the UAV 110 along the flight route 120. After the central computing device 150 maps all in-air and on-ground objects along the flight route 120 of the UAV 110 to specific locations using algorithms, measurements, and GPS geolocation, for example, grids may be applied sectioning off the maps into access ways and blocked sections, enabling the UAV 110 to use such grids for navigation and recognition. The grids may be applied to 2D horizontal maps along with 3D models. Such grids may start at a higher unit level and then can be broken down into smaller units of measure by the central computing device 150 when needed to provide more accuracy. In some aspects, for various on-ground facilities (e.g., residential or commercial buildings, schools, parks/recreation, etc.) determined by the computing device 150 proximate the predicted emergency landing location 125, the computing device 150 is configured to analyze the working hours at such buildings (in order to assess potential personal injury risk in the event of a UAV 110 crashing at such facilities), as well as to obtain information regarding electronic devices 170 (e.g., central computers, mobile phones, etc.) present at such facilities (in order to enable the UAV 110 and/or the computing device 150) to transmit an emergency alert signal to such electronic devices 170 and warn the users of the electronic devices 170 and/or other people 175 at such facilities that a UAV 110 is going to crash land into or near such facilities.

FIG. 3 presents a more detailed exemplary embodiment of the UAV 310 of FIG. 1. In this example, the UAV 310 has a housing 302 that contains (partially or fully) or at least supports and carries a number of components. These components include a control unit 304 comprising a control circuit 306 that, like the control circuit 210 of the central computing device 150, controls the general operations of the UAV 310. The control unit 304 includes a memory 308 coupled to the control circuit 306 for storing data such as operating instructions and/or useful data.

In some embodiments, the control circuit 306 operably couples to a motorized leg system 309. This motorized leg system 309 functions as a locomotion system to permit the UAV 310 to land onto the ground or onto a landing pad at the delivery destination 180 and/or to move laterally at the delivery destination 180 or at an emergency landing location 125 after the UAV 110 crash lands. Various examples of motorized leg systems are known in the art. Further elaboration in these regards is not provided here for the sake of brevity save to note that the control circuit 306 may be configured to control the various operating states of the motorized leg system 309 to thereby control when and how the motorized leg system 309 operates.

In the exemplary embodiment of FIG. 3, the control circuit 306 operably couples to at least one wireless transceiver 312 that is configured as a two-way transceiver and operates according to any known wireless protocol. This wireless transceiver 312 can comprise, for example, a cellular-compatible, Wi-Fi-compatible, and/or Bluetooth-compatible transceiver that can wirelessly communicate with the central computing device 150 via the network 115. These teachings will accommodate using any of a wide variety of wireless technologies as desired and/or as may be appropriate in a given application setting. These teachings will also accommodate employing two or more wireless transceivers 312. So configured, the control circuit 306 of the UAV 310 can provide information (e.g., sensor input) to the central computing device 150 (via the network 115) and can receive information and/or movement (e.g., routing and rerouting) instructions from the central computing device 150.

In some embodiments, the wireless transceiver 312 is configured to receive a signal containing instructions including the flight route 120 and/or rerouting information transmitted from the central computing device 150, and that can transmit one or more signals to the central computing device 150. For example, the control circuit 306 of the UAV 310 can receive control signals from the central computing device 150 via the network 115 containing instructions regarding directional movement of the UAV 310 along a specific, central computing device-determined flight route 120 when, for example: flying from the UAV deployment station 185 to the delivery destination 180 to drop off and/or pick up a product 190, when returning from the delivery destination 180 after dropping off or picking up a product 190 to the UAV deployment station 185, or when experiencing an emergency landing toward the predicted emergency landing location 125. In particular, as discussed above, the central computing device 150 can be configured to analyze GPS coordinates of the delivery destination 180 designated by the customer, determine a flight route 120 for the UAV 110 to the delivery destination 180, and transmit to the wireless transceiver 312 of the UAV 110 a first control signal including the flight route 120 over the network 115. The UAV 110, after receipt of the first control signal from the central computing device 150, is configured to navigate along the flight route 120, based on the route instructions in the control signal, to the delivery destination 180.

In some embodiments, the UAV 310 is configured to transmit, via the transceiver 312, electronic emergency (e.g., SOS) signals indicating that the UAV 110 is experiencing an emergency condition that requires an emergency landing of the UAV 310. In one approach, the electronic emergency signal transmitted by the UAV 310 includes an identification of the emergency condition (e.g., rock, bird, another UAV, electrical/mechanical failure, etc.) In some embodiments, the UAV 310 is configured to generate and transmit an alert to electronic devices 170 and/or people 175 at the predicted emergency landing location 125. In one aspect, as will be described in more detail below, the UAV 310 generates an audible alert (e.g., a siren or verbal warning) via the audio output 318, thereby warning people 175 in the predicted emergency landing location 125 that a UAV 310 is going to crash land nearby. In another aspect, the UAV 310 is configured to transmit the alert via the transceiver 312 (directly or indirectly) to electronic devices 170 (e.g., in text message and/or audible alert form) in the predicted emergency landing area 125.

In some aspects, the UAV 310 is configured to transmit an alert signal to electronic devices other than the central computing device 150, for example, ground vehicles, emergency alert stations, emergency alert-generating devices, and/or other computing devices that are coupled, or are otherwise configured, to audibly and/or visually generate and transmit an emergency alert to the electronic devices 170 and/or people 175 in the emergency landing location 125. For example, after receiving the SOS signal from the UAV 310, one or more ground vehicles, emergency alert stations, and emergency alert-generating devices generate an audible alert signal and/or a visual alert signal configured to be displayed on electronic devices 170 and/or perceived (visually and/or audibly) by people 175 at the predicted emergency landing location 125 without assistance from their electronic devices. In some aspects, after the UAV 310 lands at the predicted emergency landing location 125, the UAV 310 is configured to transmit an electronic emergency signal to the central computing device 150 and/or other electronic devices via the transceiver 312 of the UAV 310 and the network 115 in order to facilitate the recovery of the UAV 310. For example, in some aspects, the electronic emergency signal can include electronic data identifying the UAV 310, task data associated with the UAV 310 during the flight mission, as well as electronic data identifying the type of products 190 (e.g., grocery, frozen, fragile, dry goods, bio-hazard, hazardous materials classification, etc.) contained in the UAV 310 to identify possible hazards associated with recovery operations and/or to facilitate proper response requirements and/or proper handling of the UAV 310 during the recovery operations.

With reference to FIG. 3, the control circuit 306 of the UAV 310 also couples to one or more on-board sensors 314 of the UAV 310. These teachings will accommodate a wide variety of sensor technologies and form factors. In some embodiments, the on-board sensors 314 can comprise any relevant device that detects and/or transmits at least one status of the UAV 310 during flight of the UAV 110 along the flight route 120. The sensors 314 of the UAV 310 can include but are not limited to: altimeter, velocimeter, thermometer, photocell, battery life sensor, video camera, radar, lidar, laser range finder, and sonar. In some embodiments, the information obtained by one or more sensors 314 of the UAV 310 is used by the UAV 310 and/or the central computing device 150 in functions including but not limited to: navigation, landing, on-the-ground object/people detection, potential in-air threat detection, crash damage assessments, distance measurements, topography mapping, location determination, emergency detection.

In some aspects, the status input detected and/or transmitted by one or more sensors 314 of the UAV 310 includes but is not limited to location data associated with the UAV 310. Such location data can include, for example GPS coordinates of the UAV 310, marker beacon data along the flight route 120, and way point data along the flight route 120, all of which enable the control circuit 210 of the central computing device 150 and/or the control circuit 306 of the UAV 310, based on an analysis of at least such location data, to predict an emergency landing location 125 where the UAV 310 would land if unable to fly due to an emergency condition at a given point along the flight route 120. In some embodiments, the status input detected and/or transmitted by the at least one sensor 314 of the UAV 310 includes UAV status data including but not limited to propeller status, electronics status, communication status, interfering radio frequency (RF) status. For example, the UAV 310 can include at least one sensor 314 configured to monitor the function of, and to detect any malfunction of, any mechanical or electronic component of the UAV 310.

In some aspects, the sensors 314 of the UAV 310 are configured to detect rotation speed of the propellers of the UAV 310, detect directional movement of the UAV 310, measure ambient temperature surrounding the UAV 310, capture images and/or video in the air around the UAV 310 or on the ground below the UAV 310 along the flight route 120 of the UAV 310, capture thermographic, infrared, and/or multi spectral images of such in-air or on ground objects, capture images of entities attempting to tamper with UAV 310. Such sensors 314 include but are not limited to one or more accelerometers, gyroscopes, odometers, location sensors, microphones, distance measurement sensors (e.g., laser sensors, sonar sensors, sensors that measure distance by emitting and capturing a wireless signal (which can comprise light and/or sound) or the like), 3D scanning sensors, other such sensors, or a combination of two or more of such sensors.

In some embodiments, the status input detected and/or transmitted by the at least one sensor 314 of the UAV 310 includes flight mission data of the UAV 310. Such flight mission data can include but is not limited to: dimensional characteristics of the product(s) 190 being transported by the UAV 310; weight of the product(s) 190 being transported by the UAV 310; total weight of the UAV 310; component configuration of the UAV 310; altitude of the UAV 310; speed of the UAV 310; ambient wind speed; ambient temperature; ambient light level, in-air objects proximate the UAV 310 along the flight route 120; RF signal strengths prior to onset of emergency conditions, last recognized wireless (e.g., Wi-Fi) networks prior to emergency condition, last visual imaged captured prior to onset of emergency condition and/or prior to crash landing; distance of the UAV 310 to the in-air objects; angle of incidence of the UAV 310 relative to the in-air objects; last command received by the UAV 310 prior to onset of emergency condition, remaining battery life of the UAV 310; start- and end-points of the UAV 310 along the flight route 120; last known mission status of the UAV 310 (on route to delivery destination 185, returning to the UAV deployment station 185, delivery cancelled, etc.), original path of the UAV 310 along the flight route 120; location of one or more mobile relay stations along the flight route 120; location of at least one facility of the retailer having a safe landing point along the flight route 120; total dollar value of the products 190 being transported by the UAV 310; and total dollar value of the UAV 310. In some embodiments, such data obtained by the sensors 314 can be used to locate and/or recover the drone post-crash at the predicted emergency landing location 125. In some aspects, such data may be used to enable post-crash UAV recovery 310 and/or post-crash forensics/diagnostics, for example, to determine the cause of the emergency condition (e.g., in-air object, RF signal jamming, electrical, mechanical, or electronic malfunction, or the like) that caused the UAV 310 to crash.

For example, in some aspects, the sensors 314 include one or more devices that can be used to capture data related to one or more in-air objects (e.g., other UAVs 310, helicopters, birds, rocks, etc.) located within a threshold distance relative to the UAV 310. For example, the UAV 310 includes at least one on-board sensor 314 configured to detect at least one obstacle between the UAV 310 and the delivery destination 180 designated by the customer and/or the predicted emergency landing location 125. Based on the detection of one or more obstacles by such a sensor 314, the UAV 310 is configured to avoid the obstacle(s). In some aspects, the UAV 310 may attempt to avoid detected obstacles, and if unable to avoid, to notify the central computing device 150 of such a condition. In some aspects, using on-board sensors 314 (such as distance measurement units, e.g., laser or other optical-based distance measurement sensors), the UAV 310 detects obstacles in its path, and flies around such obstacles or stops until the obstacle is clear.

In some aspects, the UAV 310 includes sensors 314 configured to recognize environmental elements along the flight route 120 of the UAV 310 toward and/or away from the delivery destination 180. Such sensors 314 can provide information that the control circuit 306 and/or the central computing device 150 can employ to determine a present location, distance, and/or orientation of the UAV 310 relative to one or more in-air objects and/or objects and surfaces at the delivery destination 180, and/or at the predicted emergency landing location 125. These teachings will accommodate any of a variety of distance measurement units including optical units and sound/ultrasound units. A sensor 314 may comprise an altimeter and/or a laser distance sensor device capable of determining a distance to objects in proximity to the sensor 314. Such information obtained by sensors 314 may be processed by the control circuit 306 of the UAV 310 and/or the control circuit 210 of the central computing device 150 to determine, for example, the objects (buildings, cars, bus stops, parks, schools, etc.) that may be damages and/or people that may be injured by the crashing of the UAV 310 at the predicted emergency landing location 125.

In some embodiments, such information obtained by sensors 314 is used by the computing device 150 and/or the UAV 110 to calculate a predicted casualty radius within which people 175 can be injured and property can be damaged by the emergency landing of the UAV 110 at the predicted emergency landing location 125. In some aspects, the control circuit 210 of the computing device 150 and/or the control circuit 306 of the UAV 310 are programmed to determine the presence of: electronic devices 170 (e.g., mobile phones, personal computers, loudspeakers, etc.) located within the predicted casualty radius and/or otherwise configured to display/transmit information to people 175 located in the predicted emergency landing location 125; and in-air electronic devices located proximate a descent path of the UAV 310, from a given point of the flight route 120 where the emergency condition occurred, toward the predicted emergency landing location 125. Furthermore, in some aspects, the computing device 150 and the UAV 310 are configured to transmit the alert signal to the detected electronic devices of humans located within the predicted casualty radius, detected electronic devices associated with vehicles located within the predicted casualty radius, detected electronic devices associated with privately owned facilities located within the predicted casualty radius, detected electronic devices associated with public facilities located within the predicted casualty radius, and/or detected electronic devices associated with in-air objects located proximate the descent path of the UAV 310.

In some embodiments, the UAV 310 includes an on-board sensor 314 (e.g., a video camera) configured to detect map reference and/or topography and/or people and/or objects at the predicted emergency landing location 125. For example, in some aspects, one or more map reference or topography data acquired by one or more sensors 314 of the UAV 310 includes but is not limited to: no fly zones along the flight route 120, known safe emergency landing points along the flight route 120, on-the-ground people, buildings, vehicles and/or other objects, as well as hills, bodies of water, power lines, roads, and other environmental factors along the flight route 120 and/or at the predicted emergency landing location 125. As mentioned above, in some embodiments, a video camera-based sensor 314 on-board the UAV 310 may transmit images during the emergency decent of the UAV 310 all the way to the point of ground impact, thereby facilitating post-crash recovery of the UAV 310 in the predicted emergency landing location 125.

In some aspects, the sensor 314 of the UAV 310 is configured to transmit (e.g., via internal circuitry and/or via the transceiver 312) still and/or moving images of the predicted emergency landing location 125 to the control circuit 306 of the UAV 110 and/or the control circuit 210 of the central computing device 150, which allows the control circuit 306 of the UAV 310 and/or the control circuit 210 of the central computing device 150 to not only analyze the detected environmental elements and assess a personal injury risk and/or property damage risk associated with the crash landing of the UAV 310 at the predicted emergency landing location 125, but also to determine which electronic devices in the predicted emergency landing location 125 can be warned with an emergency alert signal indicating that a UAV 310 is going to crash land in the predicted emergency landing location 125. In one aspect, such analysis by the control circuit 210 of the central computing device 150 and/or the control circuit 306 of the UAV 310 can include obtaining information indicating a number of people and/or cars and/or buildings and/or other structures in a predicted casualty radius associated with the crash landing of the UAV 310.

In some embodiments, after the control circuit 210 of the central computing device 150 and/or control circuit 306 of the UAV 310 determines a predicted emergency landing location 125, the control circuit 210 of the central computing device 150 and/or control circuit 306 of the UAV 310 is programmed to detect, based on the data obtained by the sensors 314 and/or via further communications with on-ground electronic devices proximate the predicted emergency landing location 125, electronic devices that are configured for receiving (either directly or via another electronic device, emergency station, loudspeaker, electronic display, or the like) an emergency alert signal generated by the UAV 310 and/or the central computing device 150.

In some embodiments, an audio input 316 (such as a microphone) and/or an audio output 318 (such as a speaker) can also operably couple to the control circuit 306 of the UAV 310. So configured, the control circuit 306 can provide for a variety of audible sounds to enable the UAV 310 to communicate with, for example, the central computing device 150 or other UAVs, or electronic devices at the emergency landing location 125. Such sounds can include any of a variety of tones and/or sirens and/or other non-verbal sounds. Such audible sounds can also include, in lieu of the foregoing or in combination therewith, pre-recorded or synthesized speech. In some embodiments, the UAV 310 can be configured with one or more devices capable of generating (instead of or in addition to the audible alert) a visual alert (e.g., flare, smoke, flashing lights, etc.) that would be perceivable by people 175 at the predicted emergency landing location 125 without requiring assistance from their personal electronic devices.

In the embodiment illustrated in FIG. 3, the UAV 310 includes a rechargeable power source 320 such as one or more batteries. The power provided by the rechargeable power source 320 can be made available to whichever components of the UAV 310 require electrical energy. By one approach, the UAV 310 includes a plug or other electrically conductive interface that the control circuit 306 can utilize to automatically connect to an external source of electrical energy (e.g., a charging dock) to recharge the rechargeable power source 320.

The exemplary UAV 310 of FIG. 3 also includes a an input/output (I/O) device 330 that is coupled to the control circuit 306. The I/O device 330 allows an external device to couple to the control unit 304. The function and purpose of connecting devices will depend on the application. In some examples, devices connecting to the I/O device 330 may add functionality to the control unit 304, allow the exporting of data from the control unit 304, allow the diagnosing of the UAV 310, and so on.

The exemplary UAV 310 of FIG. 3 also includes a user interface 324 including for example, user inputs and/or user outputs or displays depending on the intended interaction with a user (e.g., a worker of a retailer, UAV delivery service or customer, and/or a rescue operations worker or robot). For example, user inputs could include any input device such as buttons, knobs, switches, touch sensitive surfaces or display screens, and so on. Example user outputs include lights, display screens, and so on. The user interface 324 may work together with or separate from any user interface implemented at an optional user interface unit (such as a smart phone or tablet device) usable by the worker.

In some embodiments, the UAV 310 may be controlled by a user in direct proximity to the UAV 310, for example, an operator of the UAV deployment station 185 (e.g., a driver of a moving vehicle), or by a user at any location remote to the location of the UAV 310 (e.g., regional or central hub operator). This is due to the architecture of some embodiments where the central computing device 150 outputs control signals to the UAV 310. These controls signals can originate at any electronic device in communication with the central computing device 150. For example, the signals sent to the UAV 310 may be movement instructions determined by the central computing device 150 and/or initially transmitted by a device of a user to the central computing device 150 and in turn transmitted from the central computing device 150 to the UAV 310.

The control unit 304 of the UAV 310 includes a memory 308 coupled to a control circuit 306 and storing data such as operating instructions and/or other data. The control circuit 306 can comprise a fixed-purpose hard-wired platform or can comprise a partially or wholly programmable platform. These architectural options are well known and understood in the art and require no further description. This control circuit 306 is configured (e.g., by using corresponding programming stored in the memory 308 as will be well understood by those skilled in the art) to carry out one or more of the steps, actions, and/or functions described herein. The memory 308 may be integral to the control circuit 306 or can be physically discrete (in whole or in part) from the control circuit 306 as desired. This memory 308 can also be local with respect to the control circuit 306 (where, for example, both share a common circuit board, chassis, power supply, and/or housing) or can be partially or wholly remote with respect to the control circuit 306. This memory 308 can serve, for example, to non-transitorily store the computer instructions that, when executed by the control circuit 306, cause the control circuit 306 to behave as described herein. It is noted that not all components illustrated in FIG. 3 are included in all embodiments of the UAV 310. That is, some components may be optional depending on the implementation.

As referenced above, in some aspects, after receiving one or more sensor inputs detected by one or more sensors 314 of the UAV 310 while the UAV 310 is in flight along the flight route 120 determined by the central computing device 150, the control circuit 210 of the central computing device 150 is programmed to analyze one or more of the received status inputs in order to determine a predicted emergency landing location 125 where the UAV 310 would land if unable to fly due to an emergency condition at a given point along the flight route 120. Similarly, in some embodiments, the control circuit 306 of the UAV 310 is programmed to analyze one or more status inputs obtained by one or more sensors 314 while the UAV 310 is in normal flight mode and/or facing an imminent emergency condition in order to determine the emergency landing location 125 where the UAV 110 would land if unable to fly due to the emergency condition at a given point along the flight route 120.

For example, in some aspects, the control circuit 306 of the UAV 310 and/or the control circuit 210 of the central computing device 150 is programmed to predict possible emergency landing locations 125 of the UAV 310 based on possible emergency conditions occurring at any given point along the flight route 120 of the UAV 310, which include analysis of emergency landing locations 125 including but not limited to: an emergency landing location 125 resulting from an unguided ballistic trajectory of the UAV 310 if the UAV 310 loses all power (e.g., the battery of the UAV 310 dies or is otherwise disabled) at any point along the flight route 120; an emergency landing location 125 resulting from a collision of the UAV 310 with an in-air object (e.g., bird, rock, other UAV, etc.) that causes the UAV 310 to veer off the flight route 120 and/or malfunction such that the UAV 310 is not controllable; an emergency landing location 125 resulting from a guided ballistic trajectory of the UAV 310 if the UAV 310 malfunctions or collides with an object at any point along the flight route 120 but does not lose power and remains controllable by the central computing device 150 and/or the control circuit 306 of the UAV 310 from the point along the flight route 120 where the emergency condition occurred to the emergency landing location 125 where the UAV 310 is guided to.

FIG. 4 shows an embodiment of an exemplary method 400 of controlling an UAV 110 experiencing an emergency landing and providing an emergency alert to an area proximate a predicted emergency landing location 125 of the UAV 110. The embodiment of the method 400 illustrated in FIG. 4 includes providing a UAV 110 configured to transport at least one product 190 to a delivery destination 180 via a flight route 120, with the UAV 110 including at least one sensor 314 configured to detect and transmit over a network 115 at least one status input associated with the UAV 110 during flight along the flight route 120 (step 410). The method 400 further includes providing a computing device 150 including a processor-based control circuit 210 and in communication with the UAV 110 over the network 115 (step 420).

As discussed above, the central computing device 150 is configured to obtain and analyze the relative locations of the UAV deployment station 185 and delivery destination 180 in order to determine a flight route 120 for the UAV 110 from the UAV deployment station 185 to the delivery destination 180. For example, in some embodiments, the central computing device 150 obtains GPS data associated with the delivery destination 180 from the customer information database 140 and GPS data associated with the UAV deployment station 185 from the central electronic database 160. As discussed above, the customer information database 140 and the central electronic database 160 may be implemented as a single database.

As discussed above, while the UAV 110 is in flight along the flight route 120 from the UAV deployment station 185 to the delivery destination 180, the onboard sensors 314 of the UAV 310 monitor various parameters relating to the flight mission of the UAV 310 and the status of the UAV 310. While the data detected by the sensors 314 is expected to, in most cases, indicate that the flight mission is going as planned, in certain situations, the sensors 314 may provide information regarding a possible and/or imminent emergency condition that may cause the UAV 310 to experience an emergency landing. For example, a sensor 314 may detect a malfunction (e.g., power loss, electrical short-circuit, mechanical (e.g., propeller) problem, or the like) or an imminent collision with an in-air object (e.g., a rock or another device launched from the ground, a bird, another UAV, a helicopter, or the like) that would be expected by the analyzing processor (e.g., control circuit 210 of the central computing device and/or control circuit 306 of the UAV 310) to cause the UAV 310 to experience an emergency landing. To that end, the method 400 includes determining, via the control circuit of the UAV 310 and based on an analysis of the at least one status input, that the UAV 310 is experiencing an emergency condition that requires an emergency landing of the UAV 310 (step 430).

As discussed above, the on-board sensors 314 of the UAV 310 may include but are not limited to: altimeter, velocimeter, thermometer, photocell, battery life sensor, video camera, radar, lidar, laser range finder, and sonar, and the information obtained by the sensors 314 of the UAV 310 while the UAV 310 is in flight is used by the control circuit 306 of the UAV 310 and/or the control circuit 210 of the central computing device 150 in functions including but not limited to: navigation, landing, on-the-ground object/people detection, potential in-air threat detection, crash damage assessments, distance measurements, topography mapping, location determination, emergency detection. In some aspects, the status input detected and/or transmitted by one or more sensors 314 of the UAV 310 includes but is not limited to location data associated with the UAV 310 and data relating to potential obstacles, in-air objects, and UAV status information that may be relevant to analysis, by the control circuit 306 of the UAV 310, of potential emergency conditions that may force the UAV 310 to experience a forced emergency landing, as well as of predicted emergency landing location 125 where the UAV 310 would land if unable to fly due to an emergency condition at a given point along the flight route 120.

As discussed above, in some embodiments, the control circuit 306 of the UAV 310 analyzes one or more status inputs obtained by one or more sensors 314 while the UAV 110 is in normal flight mode and/or facing an imminent emergency condition in order to determine the emergency landing location 125 where the UAV 110 would land if unable to fly due to the emergency condition at a given point along the flight route 120. To that end, the method 400 further includes analyzing, via a processor-based control circuit 306 of the UAV 310, one or more of the status inputs (acquired by the sensors 314 of the UAV 310) in order to determine a predicted emergency landing location 125 where the UAV 310 would land if unable to fly due to the detected emergency condition at a given point along the determined flight route 120 (step 440).

In some embodiments, after the control circuit 210 of the central computing device 150 and/or control circuit 306 of the UAV 310 predicts the emergency landing location 125 of the UAV 310 as a result of the emergency condition, the control circuit 306 of the UAV 310 is programmed to cause the UAV 310 to transmit an emergency signal (e.g., SOS) indicating that a crash of the UAV 310 is unavoidable and, optionally, indicating the emergency condition that caused the UAV 310 to go down. In the exemplary embodiment of FIG. 4, the method 400 of FIG. 4 includes transmitting the predicted emergency landing location 125 of the UAV 310 to the computing device 150 over the network 115 (step 450). It will be appreciated that the control circuit 306 of the UAV 310 can be programmed not only to analyze the data obtained by the sensors 314 in order to predict an emergency landing location 125 of the UAV 310 only after an emergency condition actually occurs, but also to analyze the data obtained by the sensors 314 in real-time while the UAV 310 is in flight in order to continuously predict emergency landing locations 125 of the UAV 310 if a crash-causing emergency were to occur at a given point along the route 120 of the UAV 310 toward the delivery destination 180.

Generally, determining a predicted emergency landing location 125 after the emergency condition occurs and before the UAV 310 crash lands enables the UAV 310 and/or central computing device 150 to provide a warning (directly or via another computing device) to people 175 and/or electronic devices 170 in the predicted emergency landing location 125 of the UAV 310, thereby reducing the possible personal injury and/or property damage that may result from the crash landing of the UAV 310 at the predicted emergency landing location 125. More specifically, the exemplary method 400 of FIG. 4 further includes transmitting, via the UAV 310, an alert signal to electronic devices 170 proximate the predicted emergency landing location 125 to notify users of the electronic devices that the UAV 310 is going to experience an emergency landing at the predicted emergency landing location 125 (step 460).

In some embodiments, the UAV 310 is configured to send out an emergency signal to electronic devices 170 in the predicted emergency landing area 125 via a text message. For example, the UAV 310 may transmit (via the transceiver 312 and over the network 115) an alert that the UAV 310 is crashing in the predicted emergency landing area 125 to an emergency signal station configured to transmit emergency signals (e.g., akin to kidnapped child alerts) to all mobile phones detected in an area that includes the predicted emergency landing location 125 and is serviced by the emergency signal station. In one aspect, after such an emergency signal station receives the alert from the UAV 310 over the network 115, the emergency signal station relays the alert (e.g., via a text message and/or accompanying audible alert) to the electronic devices 170 (e.g., mobile phones) located in the area covering the predicted emergency landing location 125 of the UAV 310, thereby providing a warning to users of such electronic devices 170 that a UAV 310 is imminently going to crash land at the predicted emergency landing location 125.

In another aspect, instead of sending an alert signal to an emergency signal station and relying on the emergency signal station to relay the alert signal to the electronic devices 170 in the area that covers the predicted landing location 125 of the UAV 310, the UAV 310 obtains network permission and/or electronic device information from the emergency signal station, enabling the UAV 310 to transmit (via the transceiver 312 and over the network 115) the alert signal via a text message and/or an accompanying audible alert directly to the electronic devices 170 located in the predicted landing location 125. For purposes of this disclosure, the term emergency signal station will be understood to refer to a communication hub (which may comprise a single computing device or multiple networked computing devices) having permission to transmit electronic emergency communications to electronic devices in an area services by the communications hub.

As discussed above, in some aspects, the alert signal generated by the UAV 310 is configured to provide an audible and/or a visual warning to the users of the electronic devices 170 and/or other people 175 located proximate the emergency landing location 125 where the UAV 310 is going to crash land. In some aspects, the UAV 310 is configured to emit sounds (e.g., variety of tones and/or sirens and/or other non-verbal sounds) that are loud enough for people 175 at the predicted emergency landing location 125 to hear well before the UAV 310 crash lands at the predicted emergency landing location 125, thereby providing such people 175 with enough time to escape from the potential casualty radius associated with the crash landing of the UAV 310. Instead of, or in addition to generating sound-based alerts, the UAV 310 is configured, in some embodiments, to generate a visual alert (e.g., flare, smoke, flashing lights, etc.) that would be perceivable by humans at the predicted emergency landing location 125 (as the UAV 310 is going down but prior to the crash landing of the UAV 310) without requiring assistance from their personal electronic devices.

In some aspects, the UAV 310 is configured to transmit the crash landing alert to an emergency service computing device (akin to college campus emergency warning systems and/or kidnapped children alert communication hugs) that is communicatively coupled to informational displays and/or loudspeakers in the predicted emergency landing location 125, thereby enabling the emergency service computing device to either relay the alert received from the UAV 310 to a loudspeaker and/or a visual display in the predicted emergency landing location 125 in order to warn people 175 at that location that a UAV 310 is imminently crashing nearby. Such a notification may enable the people 175 receiving such a warning pre-crash to escape the casualty radius of the crash and may enable the people 175 receiving such a warning post-crash to avoid the UAV 310 crash area, thereby facilitating UAV 310 recovery from the predicted emergency landing location 125.

In certain situations, an emergency condition may disable the UAV 310 to a degree where the UAV 310 is unable to transmit any emergency alerts. For example, a collision of the UAV 310 with another UAV may cause such physical damage to the UAV 310 that the UAV 310 loses all power and/or the transceiver 312 is damaged and unable to transmit signals. In such situations, the central computing device 150 provides a reserve warning system to electronic devices 170 and/or people 175 located in the predicted emergency landing location 125. In other words, in some embodiments, upon obtaining information indicating that the UAV 310 is unable to send or receive signals, the control circuit 210 of the computing device 150 is configured to cause the computing device 150 to transmit an audible and/or visual alert signal to electronic devices 170 and/or people 175 located proximate the predicted emergency landing location 125, thereby notifying the users of the electronic devices 170 and/or other people 175 that the UAV 310 is going to crash at the predicted emergency landing location 125. To that end, the method 400 of FIG. 4 includes transmitting, via the computing device 150 and in response to a determination by the computing device 150 that the UAV 310 is unable to transmit the alert signal, the alert signal to electronic devices 170 proximate the predicted emergency landing location 125 to notify users of the electronic devices that the UAV 310 is going to experience an emergency landing at the predicted emergency landing location 125 (step 470).

The systems and methods described herein advantageously provide for emergency alerts that warn users of electronic devices and/or others that a UAV is going to experience an emergency landing in a location where the users and/or other people would be within the predicted casualty radius of the crash landings. In addition, the systems and methods described herein advantageously provide for post-crash emergency alerts that may facilitate the recovery of the UAVs from the crash sites. As such, the systems and methods described herein not only advantageously provide an early warning to people, thereby reducing possible personal injury and/or property damage associated with a UAV crash landing, but also advantageously provide for post-crash recovery of the UAV and warn others to avoid the crash area while UAV recovery and/or crash site cleanup is in progress.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for controlling an unmanned aerial vehicle experiencing an emergency landing and providing an emergency alert to an area proximate a predicted emergency landing location of the unmanned aerial vehicle, the system comprising:

an unmanned aerial vehicle configured to transport at least one product to a delivery destination via a flight route, the unmanned aerial vehicle including at least one sensor configured to detect and transmit over a network at least one status input associated with the unmanned aerial vehicle during flight along the flight route;

a computing device including a processor-based control unit and configured for communication with the unmanned aerial vehicle over the network;

wherein the unmanned aerial vehicle includes a processor-based control circuit configured to:

determine, based on an analysis of the at least one status input, that the unmanned aerial vehicle is experiencing an emergency condition that requires an emergency landing of the unmanned aerial vehicle; and analyze the at least one sensor input in order to determine a predicted emergency landing location of the unmanned aerial vehicle; and wherein the unmanned aerial vehicle is configured to transmit an alert signal to electronic devices proximate the predicted emergency landing location to notify users of the electronic devices that the unmanned aerial vehicle is going to experience an emergency landing at the predicted emergency landing location.

2. The system of claim 1, wherein the computing device is configured to receive, over the network, an electronic signal from the unmanned aerial vehicle indicating that the unmanned aerial vehicle is experiencing an emergency condition that requires an emergency landing of the unmanned aerial vehicle, and including an identification of the emergency condition.

3. The system of claim 1, wherein the control circuit of the unmanned aerial vehicle is configured to determine the predicted emergency landing location of the unmanned aerial vehicle based on an analysis of at least one sensor input comprising: global positioning system (GPS) coordinates of the unmanned aerial vehicle; altitude of the unmanned aerial vehicle; speed of the unmanned aerial vehicle; wind speed; weight of the unmanned aerial vehicle; component configuration of the unmanned aerial vehicle; weight of the at least one product; safe landing points along the flight route; topography of the predicted emergency landing location; buildings, trees, power lines, roads, vehicles, and people at the predicted emergency landing location, in-air objects along an emergency descent of the unmanned aerial vehicle from the flight route toward the predicted emergency landing location; distance to the in-air objects; angle of incidence relative to the in-air objects; distance to objects on the ground at the predicted emergency landing location; remaining battery life of the unmanned aerial vehicle; mission status of the unmanned aerial vehicle; RF signal strengths; detectable WiFi networks; and last command received by the unmanned aerial vehicle.

4. The system of claim 1, wherein the at least one sensor comprises an altimeter, velocimeter, thermometer, photocell, battery life sensor, camera, radar, lidar, laser range finder, and sonar.

5. The system of claim 1, wherein the control circuit of the unmanned aerial vehicle is configured to analyze the at least one sensor input in order to determine a predicted emergency landing location resulting from an unguided ballistic trajectory of the unmanned aerial vehicle if the unmanned aerial vehicle loses all power at a given point along the flight route due to the emergency condition, and a predicted emergency landing location resulting from a computing device-guided trajectory of the unmanned aerial vehicle from the given point along the flight route due to the emergency condition.

6. The system of claim 1, wherein at least one of the unmanned aerial vehicle and the computing device is configured to calculate a predicted casualty radius within which humans can be injured and property can be damaged by the emergency landing of the unmanned aerial vehicle.

7. The system of claim 6, wherein the at least one of the unmanned aerial vehicle and the computing device is configured to detect at least one of: electronic devices of humans located within the predicted casualty radius; electronic devices associated with the property located within the predicted casualty radius; and in-air electronic devices located proximate a descent path of the unmanned aerial vehicle from a given point of the flight route where the emergency condition occurred toward the predicted emergency landing condition.

8. The system of claim 7, wherein the at least one of the unmanned aerial vehicle and the computing device is configured to transmit the alert signal to at least one of: detected electronic devices of humans located within the predicted casualty radius; detected electronic devices associated with vehicles located within the predicted casualty radius; detected electronic devices associated with privately owned facilities located within the predicted casualty radius; detected electronic devices associated with public facilities located within the predicted casualty radius; and detected electronic devices associated with in-air objects located proximate the descent path of the unmanned aerial vehicle.

9. The system of claim 1, wherein at least one of the unmanned aerial vehicle and the computing device is configured to generate at least one of an audible alert signal and a visual alert signal configured to be perceived by humans at the predicted emergency landing location without assistance from their electronic devices.

10. The system of claim 1, wherein at least one of the unmanned aerial vehicle and the computing device is configured to transmit the alert signal to at least one of a ground vehicle, an emergency alert station, and an emergency alert-generating device, and wherein the at least one of the ground vehicle, emergency alert station, and emergency alert-generating device, after receipt of the alert signal from the computing device, generates at least one of an audible alert signal and a visual alert signal configured to be perceived by humans at the predicted emergency landing location without assistance from their electronic devices.

11. A method for controlling an unmanned aerial vehicle experiencing an emergency landing and providing an emergency alert to an area proximate a predicted emergency landing location of the unmanned aerial vehicle, the method comprising:

providing an unmanned aerial vehicle configured to transport at least one product to a delivery destination via a flight route, the unmanned aerial vehicle including at least one sensor configured to detect and transmit over a network at least one status input associated with the unmanned aerial vehicle during flight along the flight route;

providing a computing device including a processor-based control unit and configured for communication with the unmanned aerial vehicle over the network;

determining, via the control circuit of the unmanned aerial vehicle and based on an analysis of the at least one status input, that the unmanned aerial vehicle is experiencing an emergency condition that requires an emergency landing of the unmanned aerial vehicle;

analyzing, via the control circuit of the unmanned aerial vehicle, the at least one sensor input received from the unmanned aerial vehicle in order to determine a predicted emergency landing location of the unmanned aerial vehicle; and transmitting, via the unmanned aerial vehicle, an alert signal to electronic devices proximate the predicted emergency landing location to notify users of the electronic devices that the unmanned aerial vehicle is going to experience an emergency landing at the predicted emergency landing location.

12. The method of claim 11, wherein the determining step further comprises receiving, at the computing device and over the network, an electronic signal from the unmanned aerial vehicle indicating that the unmanned aerial vehicle is experiencing an emergency condition that requires an emergency landing of the unmanned aerial vehicle, and including an identification of the emergency condition.

13. The method of claim 11, wherein the determining step further comprises determining, via control circuit of the unmanned aerial vehicle, the predicted emergency landing location of the unmanned aerial vehicle based on at least one sensor input comprising: global positioning system (GPS) coordinates of the unmanned aerial vehicle; altitude of the unmanned aerial vehicle; speed of the unmanned aerial vehicle; wind speed; weight of the unmanned aerial vehicle; component configuration of the unmanned aerial vehicle; weight of the at least one product; safe landing points along the flight route; topography of the predicted emergency landing location; buildings, trees, power lines, roads, vehicles, and people at the predicted emergency landing location, in-air objects along an emergency descent of the unmanned aerial vehicle from the flight route toward the predicted emergency landing location; distance to the in-air objects; angle of incidence relative to the in-air objects; distance to objects on the ground at the predicted emergency landing location; remaining battery life of the unmanned aerial vehicle; mission status of the unmanned aerial vehicle; RF signal strengths; detectable WiFi networks; and last command received by the unmanned aerial vehicle.

14. The method of claim 11, wherein the at least one sensor comprises an altimeter, velocimeter, thermometer, photocell, battery life sensor, camera, radar, lidar, laser range finder, and sonar.

15. The method of claim 11, wherein the analyzing step further comprises analyzing, via the control circuit of the unmanned aerial vehicle, the at least one sensor input in order to determine a predicted emergency landing location resulting from an unguided ballistic trajectory of the unmanned aerial vehicle if the unmanned aerial vehicle loses all power at a given point along the flight route due to the emergency condition, and a predicted emergency landing location resulting from a computing device-guided trajectory of the unmanned aerial vehicle from the given point along the flight route due to the emergency condition.

16. The method of claim 11, wherein the analyzing step further comprises calculating, via at least one of the unmanned aerial vehicle and the computing device, a predicted casualty radius within which humans can be injured and property can be damaged by the emergency landing of the unmanned aerial vehicle.

17. The method of claim 16, further comprising detecting, via the at least one of the unmanned aerial vehicle and the computing device, at least one of: electronic devices of humans located within the predicted casualty radius; electronic devices associated with the property located within the predicted casualty radius; and in-air electronic devices located proximate a descent path of the unmanned aerial vehicle from a given point of the flight route where the emergency condition occurred toward the predicted emergency landing condition.

18. The method of claim 17, wherein the transmitting step further comprises transmitting, via the at least one of the unmanned aerial vehicle and the computing device, the alert signal to at least one of: detected electronic devices of humans located within the predicted casualty radius; detected electronic devices associated with vehicles located within the predicted casualty radius; detected electronic devices associated with privately owned facilities located within the predicted casualty radius; detected electronic devices associated with public facilities located within the predicted casualty radius; and detected electronic devices associated with in-air objects located proximate the descent path of the unmanned aerial vehicle.

19. The method of claim 11, wherein the transmitting step further comprises generating, via at least one of the unmanned aerial vehicle and the computing device, at least one of an audible alert signal and a visual alert signal configured to be perceived by humans at the predicted emergency landing location without assistance from their electronic devices.

20. The method of claim 11, wherein the transmitting step further comprises transmitting, via at least one of the unmanned aerial vehicle and the computing device, the alert signal to at least one of a ground vehicle, an emergency alert station, and an emergency alert-generating device, and generating, via the at least one of the ground vehicle, emergency alert station, and emergency alert-generating device, at least one of an audible alert signal and a visual alert signal configured to be perceived by humans at the predicted emergency landing location without assistance from their electronic devices.

* * * * *